United States Patent
de Brouwer et al.

(10) Patent No.: US 9,260,561 B2
(45) Date of Patent: Feb. 16, 2016

(54) POLYESTERCARBONATE COPOLYMERS WITH HIGH SCRATCH RESISTANCE

(75) Inventors: Hans de Brouwer, Oisterwijk (NL); Robert Dirk van Grampel, Tholen (NL); James F. Hoover, Evansville, IN (US); Adrianus Alphonsus Maria Kusters, Chaam (NL); Jan-Pleun Lens, Rotterdam (NL); Andries Jakobus Petrus van Zyl, Roosendaal (NL)

(73) Assignee: SABIC Global Technologies B.V., Bergen Op Zoom (NL)

(*) Notice: Subject to any disclaimer, the term of this patent is extended or adjusted under 35 U.S.C. 154(b) by 1046 days.

(21) Appl. No.: 12/275,428

(22) Filed: Nov. 21, 2008

(65) Prior Publication Data

US 2010/0130700 A1    May 27, 2010

(51) Int. Cl.
    *C08L 63/00*      (2006.01)
    *C08G 63/64*      (2006.01)

(52) U.S. Cl.
    CPC ..................... *C08G 63/64* (2013.01)

(58) Field of Classification Search
    CPC ....................................................... C08L 63/00
    USPC ....................................................... 525/418
    See application file for complete search history.

(56) References Cited

U.S. PATENT DOCUMENTS

| | | | |
|---|---|---|---|
| 3,387,988 A | 6/1968 | de Lapp et al. | |
| 3,650,808 A | 3/1972 | Gagnon | |
| 5,849,414 A | 12/1998 | Bier et al. | |
| 6,265,522 B1 | 7/2001 | Brunelle et al. | |
| 6,294,647 B1 | 9/2001 | Brunelle et al. | |
| 6,538,065 B1 | 3/2003 | Suriano et al. | |
| 6,559,270 B1 | 5/2003 | Siclovan et al. | |
| 6,861,482 B2 | 3/2005 | Brunelle et al. | |
| 6,866,909 B2 | 3/2005 | Wisnudel et al. | |
| 7,226,720 B2 | 6/2007 | Wisnudel et al. | |
| 2003/0055168 A1 | 3/2003 | Barkac et al. | |
| 2004/0116585 A1 | 6/2004 | Ambrose et al. | |
| 2007/0027268 A1* | 2/2007 | Di et al. ........................ | 525/439 |
| 2007/0155913 A1 | 7/2007 | Chakravarti et al. | |
| 2008/0011513 A1 | 1/2008 | Kamps et al. | |
| 2009/0062438 A1 | 3/2009 | van de Grampel et al. | |
| 2010/0099792 A1* | 4/2010 | Gallucci et al. ............... | 523/105 |
| 2014/0275449 A1* | 9/2014 | Hoover et al. .................. | 526/64 |

FOREIGN PATENT DOCUMENTS

WO      2005049320 A1      6/2005

OTHER PUBLICATIONS

PCT International Search Report for International Application No. PCT/US2009/064683.
Cojocariu, Gheorghe et al: "Transparent Injection Moldable LEXAN* SLX Resins", ANTEC: Annual Technical Conference—Society of Plastics Engineers, vol. 2, Jan. 1, 2005, pp. 2528-2532, XP002503792.

* cited by examiner

*Primary Examiner* — Megan McCulley
(74) *Attorney, Agent, or Firm* — Richard M. Klein; Fay Sharpe LLP (57) ABSTRACT

Disclosed are polyestercarbonate copolymers comprising a carbonate unit of Formula (I), an ITR ester unit of Formula (V), and optionally a different carbonate unit of Formula (VI):

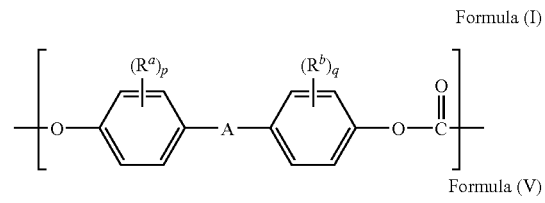

Formula (I)

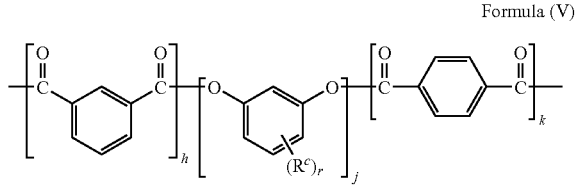

Formula (V)

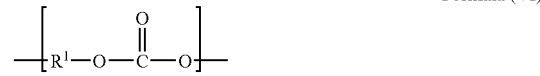

Formula (VI)

wherein $R^a$, $R^b$, p, q, A, h, j, k, $R^c$, r, and $R^1$ are as described herein. The polyestercarbonate copolymers have a combination of scratch resistance, good flow, and good weatherability.

6 Claims, 5 Drawing Sheets

POLYESTERCARBONATE COPOLYMERS WITH HIGH SCRATCH RESISTANCE

BACKGROUND

The present disclosure relates to certain polyestercarbonate copolymers having a combination of high scratch resistance and weatherability. Also disclosed herein are methods for preparing and/or using the same.

Polycarbonates are synthetic thermoplastic resins derived from bisphenols and phosgenes, or their derivatives. They are linear polyesters of carbonic acid and can be formed from dihydroxy compounds and carbonate diesters, or by ester interchange. Polymerization may be in aqueous, interfacial, or in nonaqueous solution.

Lightweight thermoplastic materials that have a glossy or semi-gloss finished appearance are useful materials of construction for a wide variety of molded products such as medical devices, radio and TV bezels (i.e. grooved rims for holding glass or plastic panes such as lenses, tuning dials, and other indicating devices), mobile phone keypads, notebook computer housings and keys, optical display films, automotive parts, and other electronic and consumer products. Polycarbonate-based materials, with their high surface gloss capability, high transparency, and excellent impact strength, are useful for such applications.

Such applications expose the molded product to indoor and outdoor conditions of light and moisture. Thus, weatherability, such as color stability and surface finish, is typically desired. Weatherable polycarbonates, however, may have lower ductility and decreased flow properties, and are thus less desirable for use in some applications where high ductility and thermoformability are useful.

Scratch resistance is also useful for molded products or articles whose exterior surface may be subject to physical contact by other objects. For example, everyday activities which can scratch an article may include sliding on a surface, dropping, and rubbing against other items such as coins or keys when placed in a pocket. Polymer compositions with scratch resistance are therefore desirable in articles requiring a durable surface finish and appearance.

In particular, polycarbonates based on bisphenol-A (BPA) have limited scratch resistance. The introduction of scratches causes loss of optical properties, such as transparency in clear compositions and haze or gloss in opaque compositions. Scratches also decrease the aesthetic appeal of a product.

One method of preventing or minimizing scratch damage is to apply a hardcoat to an article formed from a BPA polycarbonate. This hardcoat requires another manufacturing step, adding additional cost to the article.

Another method is to use a scratch-resistant material made from a copolymer of BPA and dimethyl bisphenol cyclohexane (DMBPC). These copolymers have excellent scratch resistance, but decreased impact properties and ductility compared to BPA homopolymers. DMBPC homopolymers have a 6-fold increase in scratch resistance compared to polycarbonates based on BPA and up to a 2-fold increase compared to a BPA-DMBPC copolymer, based on the pencil hardness scale. However, DMBPC homopolymers also have decreased impact properties and ductility compared to polycarbonates based on BPA.

It would be desirable to provide a polycarbonate composition that has a combination of high scratch resistance and weatherability, while maintaining other physical properties such as flow characteristics, haze, and light transmittance.

BRIEF DESCRIPTION

Disclosed, in various embodiments, are polyestercarbonate copolymers and processes for making and using them. The polyestercarbonate copolymers have a combination of good scratch resistance and weatherability.

In some embodiments is disclosed a polyestercarbonate copolymer comprising:

a carbonate unit of Formula (I):

Formula (I)

wherein each $R^a$ and $R^b$ is independently halogen or hydrocarbon; p and q are independently integers from 1 to 4; and A is selected from $C_1$-$C_{12}$ alkyl, $C_6$-$C_{20}$ aromatic, and $C_6$-$C_{20}$ cycloaliphatic; and an ester unit of Formula (II):

Formula (II)

wherein $R^2$ and T are independently divalent organic radicals.

The carbonate unit of Formula (I) can be a dimethyl bisphenol cyclohexane (DMBPC) unit having the structure of Formula (III):

Formula (III)

The ester unit of Formula (II) can be an ester unit having the structure of Formula (IV):

Formula (IV)

wherein each $R^c$ is independently selected from $C_1$-$C_{12}$ alkyl and halogen; and r is an integer from 0 to 3.

The ester unit of Formula (II) can alternatively be an ITR unit (derived from Isophthalate, Terephthalate, and Resorcinolate) having the structure of Formula (V):

Formula (V)

wherein h corresponds to the molar percentage of the isophthalate, j corresponds to the molar percentage of the resorcinolate, and k corresponds to the molar percentage of the terephthalate; h, j, and k add up to 100 mole percent of the ester unit; each $R^c$ is independently selected from $C_{1-12}$ alkyl and halogen; and r is an integer from zero to 3.

The polyestercarbonate copolymer may contain from about 20 to about 90 mole percent of the carbonate unit of Formula (I); and from about 5 to about 80 mole percent of the ester unit of Formula (II).

The polyestercarbonate copolymer may alternatively contain from about 25 to about 60 mole percent of the carbonate unit of Formula (I); and from about 5 to about 30 mole percent of the ester unit of Formula (II).

The polyestercarbonate copolymer may further comprise a carbonate unit of Formula (VI):

Formula (VI)

wherein $R^1$ is a divalent organic radical; and the carbonate unit of Formula (VI) is different from the carbonate unit of Formula (I).

The carbonate unit of Formula (VI) can be a bisphenol-A unit having the structure of Formula (VII):

Formula (VII)

The carbonate unit of Formula (VI) may be present in the amount of from about 5 to about 50 mole percent, including from about 20 to about 50 mole percent.

The polyestercarbonate copolymer may have a scratch resistance of 15 micrometers or less, when measured using the Erichson Scratch Test with a 6N load; a haze level below 5, as measured by ASTM D1003; a light transmittance greater than 75%, as measured by ASTM D1003; a melt volume rate of 25 cc/10 minutes or less, according to ASTM D1238; a total color shift dE* of 12 or less after 500 hours exposure, according to ASTM D2244; a weight average molecular weight of 20,000 or greater; a gloss of 40 or higher when measured according to ASTM D523 after 1000 hours weathering according to SAE J1885; or a gloss of 90 or higher when measured according to ASTM D523 after 1000 hours weathering according to SAE J1960.

In some embodiments, the polyestercarbonate copolymer has a scratch resistance of 15 micrometers or less, when measured using the Erichson Scratch Test with a 6N load; and a haze level below 5 and a percent transmittance higher than 75, both as measured by ASTM D1003.

In other embodiments, the polyestercarbonate copolymer has a scratch resistance of 15 micrometers or less, when measured using the Erichson Scratch Test with a 6N load; and a melt volume rate of 25 cc/10 minutes or less, according to ASTM D1238.

Disclosed in other embodiments is a polyestercarbonate copolymer comprising:
from about 25 to about 90 mole percent of a DMBPC unit of Formula (III):

Formula (III)

from about 5 to about 25 mole percent of a carbonate unit of Formula (VIII):

Formula (VIII)

wherein each $R^a$ and $R^b$ is independently halogen or $C_1$-$C_{12}$ alkyl; p and q are independently integers from 0 to 4; and A is selected from $C_1$-$C_{12}$ alkyl, $C_6$-$C_{20}$ aromatic, and $C_6$-$C_{20}$ cycloaliphatic; and the carbonate unit of Formula (VIII) is different from the DMBPC unit of Formula (IV); and from about 5 to about 50 mole percent of an ester unit of Formula (IV):

Formula (IV)

wherein each $R^c$ is independently selected from $C_1$-$C_{12}$ alkyl and halogen; and r is an integer from 0 to 3.

Disclosed in other embodiments is a polyestercarbonate copolymer comprising:
from about 25 to about 90 mole percent of a DMBPC unit of Formula (III):

Formula (III)

and from about 10 to about 75 mole percent of an ester unit of Formula (IV):

Formula (IV)

wherein each $R^c$ is independently selected from $C_1$-$C_{12}$ alkyl and halogen; and r is an integer from 0 to 3.

Also disclosed are methods of preparing a polyestercarbonate copolymer, comprising:

providing a polycarbonate polymer of Formula (IX) and a polyestercarbonate polymer of Formula (X):

Formula (IX)

wherein each $R^a$ and $R^b$ is independently halogen or hydrocarbon; p and q are independently integers from 1 to 4; A is selected from $C_1$-$C_{12}$ alkyl, $C_6$-$C_{20}$ aromatic, and $C_6$-$C_{20}$ cycloaliphatic; and w is the degree of polymerization;

Formula (X)

wherein $R^1$, $R^2$, and T are independently divalent organic radicals; m is the molar percentage of carbonate units; and n is the molar percentage of ester units;

mixing the polycarbonate polymer, the polyestercarbonate polymer, and a chain transfer catalyst to form a mixture; and reacting the mixture in situ to form the polyestercarbonate copolymer.

Additionally disclosed are polycarbonate polymers comprising:
a carbonate unit of Formula (I):

Formula (I)

wherein each $R^a$ and $R^b$ is independently halogen or hydrocarbon; p and q are independently integers from 1 to 4; and A is selected from $C_1$-$C_{12}$ alkyl, $C_6$-$C_{20}$ aromatic, and $C_6$-$C_{20}$ cycloaliphatic; and an ITR ester unit of Formula (V):

Formula (V)

wherein h corresponds to the molar percentage of the isophthalate, j corresponds to the molar percentage of the resorcinolate, and k corresponds to the molar percentage of the terephthalate; h, j, and k add up to 100 mole percent of the ester unit; each $R^c$ is independently selected from $C_{1-12}$ alkyl and halogen; and r is an integer from zero to 3.

In additional embodiments, the polycarbonate polymer has a scratch resistance of 15 micrometers or less, when measured using the Erichson Scratch Test with a 6N load. In other embodiments, the polyestercarbonate copolymer has a scratch resistance of 15 micrometers or less, when measured using the Erichson Scratch Test with a 6N load; and a haze level below 5 and a percent transmittance higher than 75, both as measured by ASTM D1003.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise. All ranges disclosed herein are inclusive of the recited endpoint and independently combinable (for example, the range of "from 2 grams to 10 grams" is inclusive of the endpoints, 2 grams and 10 grams, and all the intermediate values).

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4."

The term "integer" means a whole number and includes zero. For example, the expression "n is an integer from 0 to 4" means n may be any whole number from 0 to 4, including 0.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen or may be composed exclusively of carbon and hydrogen. Aliphatic groups may be substituted or unsubstituted. Exemplary aliphatic groups include, but are not limited to, methyl, ethyl, isopropyl, isobutyl, chloromethyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted or unsubstituted. Exemplary alkyl groups include, but are not limited to, methyl, ethyl, and isopropyl.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-CCl$_3$Ph-).

The term "cycloaliphatic" refers to an array of atoms which is cyclic but which is not aromatic. The cycloaliphatic group may include heteroatoms such as nitrogen, sulfur, selenium, silicon and oxygen, or may be composed exclusively of carbon and hydrogen. A cycloaliphatic group may comprise one or more noncyclic components. For example, a cyclohexylmethyl group (C$_6$H$_{11}$CH$_2$) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The polyestercarbonate copolymers of the present disclosure comprise at least two units: (a) a carbonate unit of Formula (I); and (b) an ester unit of Formula (II). In particular embodiments, the polyestercarbonate copolymer is a terpolymer, wherein the copolymer further comprises (c) a carbonate unit of Formula (VI), as further described below.

The carbonate unit of Formula (I) in the polyestercarbonate copolymer is:

Formula (I)

wherein each R$^a$ and R$^b$ is independently halogen or C$_1$-C$_{12}$ alkyl; p and q are independently integers from 1 to 4; and A is selected from C$_1$-C$_{12}$ alkyl, C$_6$-C$_{20}$ aromatic, and C$_6$-C$_{20}$ cycloaliphatic. Exemplary groups for A include divalent alkyl or cycloalkyl groups like 2,2-propyl or 1,1-cyclohexyl.

In some specific embodiments, the carbonate unit of Formula (I) is derived from 1,1-bis(4-hydroxy-3-methylphenyl)cyclohexane (DMBPC) and has the structure of Formula (III):

Formula (III)

The ester unit of Formula (II) in the polyestercarbonate copolymer is:

Formula (II)

wherein R$^2$ and T are independently divalent organic radicals.

R$^2$ is a divalent group generally derived from a dihydroxy compound and may be, for example, a C$_{2\text{-}10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms. In some embodiments, $R^2$ is a $C_{2-10}$ alkylene group having a straight chain, branched chain, or cyclic (including polycyclic) structure. In other embodiments, $R^2$ is derived from an aromatic dihydroxy compound of formula (4) or (7) as described further below.

T is a divalent group generally derived from a dicarboxylic acid, and may be, for example, a $C_{2-10}$ alkylene group, a $C_{6-20}$ alicyclic group, a $C_{6-20}$ alkyl aromatic group, or a $C_{6-20}$ aromatic group such as phenyl. In particular, T may be derived from an aromatic dicarboxylic acid. Exemplary aromatic dicarboxylic acids used to prepare the ester unit of Formula (II) include isophthalic acid, terephthalic acid, 1,2-di(p-carboxyphenyl)ethane, 4,4'-dicarboxydiphenyl ether, 4,4'-bisbenzoic acid, cyclohexane dicarboxylic acid, and combinations thereof. Acids containing fused rings can also be present, such as in 1,4-, 1,5-, or 2,6-naphthalene dicarboxylic acids. In some specific embodiments, T is derived from a combination of isophthalic acid and terephthalic acid.

In other specific embodiments, $R^2$ is a $C_{2-6}$ alkylene group and T is p-phenylene, m-phenylene, naphthalene, a divalent cycloaliphatic group, or a combination thereof. This class of ester units includes the poly(alkylene terephthalates).

Useful polyesters may include aromatic polyesters, poly(alkylene esters) including poly(alkylene arylates), and poly(cycloalkylene diesters). Aromatic polyesters may have a polyester structure according to Formula (II), wherein $R^2$ and T are each aromatic groups as described hereinabove. Useful aromatic polyesters may include, for example, poly(isophthalate-terephthalate-resorcinol) esters, poly(isophthalate-terephthalate-bisphenol-A) esters, poly[(isophthalate-terephthalate-resorcinol) ester-co-(isophthalate-terephthalate-bisphenol-A)] ester, or a combination comprising at least one of these. Also contemplated are aromatic polyesters with a minor amount, e.g., about 0.5% by weight to about 10% by weight, based on the total weight of the polyester, of units derived from an aliphatic diacid and/or an aliphatic polyol to make copolyesters. Poly(alkylene arylates) may have a polyester structure according to Formula (II), wherein T comprises groups derived from aromatic dicarboxylates, cycloaliphatic dicarboxylic acids, or derivatives thereof. Specifically, where T is 1,4-phenylene, the poly(alkylene arylate) is a poly(alkylene terephthalate). Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly(cyclohexanedimethylene terephthalate) (PCT). Combinations comprising at least one of the foregoing polyesters may also be used.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (1):

(1)

wherein, as described using Formula (II), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

In particular embodiments, the ester unit of Formula (II) is an ester unit having the structure of Formula (IV):

Formula (IV)

wherein each $R^c$ is independently selected from $C_1$-$C_{12}$ alkyl and halogen; and r is an integer from 0 to 3.

In more specific embodiments of Formula (II), the ester unit is an ITR unit derived from the reaction of isophthalic acid, terephthalic acid, and a resorcinol moiety. The ITR unit has the general structure of Formula (V):

Formula (V)

wherein h corresponds to the molar percentage of the isophthalate, j corresponds to the molar percentage of the resorcinolate, and k corresponds to the molar percentage of the terephthalate; h, j, and k add up to 100 mole percent of the ester unit; each $R^c$ is independently selected from $C_{1-12}$ alkyl and halogen; and r is an integer from zero to 3.

In some embodiments, the ratio of isophthalate to terephthalate (h:k) is from about 0.2 to about 4.0. In further embodiments, the ratio h:k is from about 0.4 to about 2.5, or from about 0.67 to about 1.5.

In some embodiments, the polyestercarbonate copolymer is a terpolymer and further comprises a carbonate unit of Formula (VI):

Formula (VI)

wherein $R^1$ is a divalent organic radical. The carbonate units of Formulas (I) and (VI) will always be different.

At least 60 percent of the total number of $R^1$ groups are aromatic organic radicals and the balance thereof are aliphatic, alicyclic, or aromatic radicals. In some embodiments, each $R^1$ is an aromatic organic radical, for example a radical of the formula (2):

$$-A^1-Y^1-A^2- \qquad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

$$HO-A^1-Y^1-A^2-OH \qquad (3)$$

wherein $Y^1$, $A^1$ and $A^2$ are as described above. Also included are bisphenol compounds of general formula (4):

wherein $R^a$ and $R^b$ each represent a halogen atom or a monovalent hydrocarbon group and may be the same or different; p and q are each independently integers of 0 to 4; and $X^a$ represents one of the groups of formula (5):

wherein $R^c$ and $R^d$ each independently represent a hydrogen atom or a monovalent linear or cyclic hydrocarbon group and $R^e$ is a divalent hydrocarbon group.

In an embodiment, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group may have 3 to 20 atoms, and may be a single saturated or unsaturated ring, or fused polycyclic ring system wherein the fused rings are saturated, unsaturated, or aromatic.

Other specific examples of bisphenol compounds represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, 3,3-bis (4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations of these foregoing dihydroxy aromatic compounds can also be used.

Other bisphenols containing substituted or unsubstituted cyclohexane units can be used, for example bisphenols of formula (6):

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—$R^1$—OH include aromatic dihydroxy compounds of formula (7):

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

In specific embodiments, the carbonate unit of Formula (VI) is a bisphenol-A unit having the structure of Formula (VII):

Formula (VII)

In some embodiments, the carbonate unit of Formula (VI) may be a carbonate unit of Formula (VIII):

Formula (VIII)

wherein each $R^a$ and $R^b$ is independently halogen or $C_1$-$C_{12}$ alkyl; p and q are independently integers from 0 to 4; and A is selected from $C_1$-$C_{12}$ alkyl, $C_6$-$C_{20}$ aromatic, and $C_6$-$C_{20}$ cycloaliphatic. This formula is similar to that of Formula (I); however, the carbonate unit selected for Formulas (I) and (VIII) will always be different.

The carbonate unit of Formula (I) may be present in the polyestercarbonate copolymer in an amount of from about 20 to about 90 mole percent (mole %), including from about 25 to about 60 mole percent. The ester unit of Formula (II) may be present in the polyestercarbonate copolymer in an amount of from about 5 to about 80 mole percent, including from about 5 to about 30 mole percent. The carbonate unit of Formula (VI) may be present in the polyestercarbonate copolymer in an amount of from about 5 to about 50 mole percent, including from about 20 to about 50 mole percent.

In some embodiments, the carbonate unit of Formula (I) is present in the amount of from about 30 to about 90 mole percent; the ester unit of Formula (II) is present in the amount of from about 5 to about 50 mole percent; and the carbonate unit of Formula (VI) is present in the amount of from about 5 to about 25 mole percent.

In other specific embodiments, the carbonate unit of Formula (I) is present in the amount of from about 30 to about 55 mole percent; the ester unit of Formula (II) is present in the amount of from about 20 to about 50 mole percent; and the carbonate unit of Formula (VI) is present in the amount of from about 15 to about 25 mole percent.

The polyestercarbonate copolymer can be manufactured by processes such as interfacial polymerization and melt polymerization. Although the reaction conditions for interfacial polymerization may vary, an exemplary process generally involves dissolving or dispersing a dihydric phenol moiety in aqueous caustic soda or potash, adding the resulting mixture to a suitable water-immiscible solvent medium, and contacting the reactants with a dicarboxylic acid moiety to form ester units. Next, the dihydroxy compound is added and reacted with a carbonate precursor in the presence of a catalyst such as triethylamine or a phase transfer catalyst, under controlled pH conditions, to form the polyestercarbonate copolymer. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be about 0.1% by weight to about 10% by weight based on the weight of bisphenol in the phosgenation mixture. In another embodiment an effective amount of phase transfer catalyst may be about 0.5% by weight to about 2% by weight based on the weight of bisphenol in the phosgenation mixture.

Branched polycarbonate blocks may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents may be added at a level of about 0.05% by weight to about 2.0% by weight. Mixtures comprising linear polycarbonates and branched polycarbonates may be used.

In particular embodiments, an initial mixture is formed which comprises a dihydroxyaromatic moiety, a catalyst, water, and a substantially water-immiscible organic solvent. The initial mixture is reacted by adding a first dicarboxylic acid moiety and a second dicarboxylic acid moiety to the initial mixture while maintaining the pH at about 4 to 5 to form an intermediate mixture. Generally, the two dicarboxylic acid moieties are added at the same time as a mixture. Next, a first dihydroxy compound and a second dihydroxy compound are added to the intermediate mixture. The intermediate mixture is then reacted by adding a carbonate precursor to the intermediate mixture while maintaining the pH at about 8 to 9 to form the polyestercarbonate copolymer.

In embodiments, the first dicarboxylic acid moiety is a terephthalate moiety and the second dicarboxylic acid moiety is an isophthalate moiety. In other embodiments, the first dihydroxy compound is DMBPC and the second dihydroxy compound is bisphenol-A. Phosgene is usually used as the carbonate precursor. Exemplary dihydroxyaromatic moieties include resorcinol, hydroquinone, and catechol.

Other methods of making the polyestercarbonate copolymer via interfacial polymerization may include those described in U.S. Pat. Nos. 6,265,522; 6,294,647; 6,538,065; 6,559,270; and 6,861,482. The disclosures of these patents are hereby fully incorporated by reference herein.

The polyestercarbonate copolymer can also be made by reactive extrusion. Reactive extrusion is a process that generally takes place in an extruder and involves a chemical reaction between feed polymers. For example the polyestercarbonate copolymer can be formed by providing a polycarbonate polymer of Formula (IX) and a polyestercarbonate polymer of Formula (X):

Formula (IX)

wherein each $R^a$ and $R^b$ is independently halogen or hydrocarbon; p and q are independently integers from 1 to 4; A is selected from $C_1$-$C_{12}$ alkyl, $C_6$-$C_{20}$ aromatic, and $C_6$-$C_{20}$ cycloaliphatic; and w is the degree of polymerization;

Formula (X)

wherein $R^1$, $R^2$, and T are independently divalent organic radicals; m is the molar percentage of carbonate units; and n is the molar percentage of ester units. A mixture is formed of the polycarbonate polymer of Formula (IX), the polyestercarbonate polymer of Formula (X), and a chain transfer catalyst. The mixture is then reacted to combine the two polymers together to form the polyestercarbonate copolymer.

The polyestercarbonate polymers of Formula (X) are available from SABIC Innovative Plastics with various molar ratios of ester units to carbonate units, or n:m.

In particular embodiments, the polyestercarbonate polymer of Formula (X) contains from about 50 to 99.9 mole percent of the ester unit. In other words, the ratio of n:m can be from about 50:50 to about 99.9:0.1. The polyestercarbonate polymer may also contain from about 56 to about 90 mole percent of the ester unit.

In embodiments, the polyester units are substantially free of anhydride linkages. "Substantially free of anhydride linkages" means that the polyestercarbonate polymer of Formula (X) shows a decrease in molecular weight of less than 10% upon heating said polyestercarbonate polymer at a temperature of about 280° C. to 290° C. for five minutes. In more particular embodiments, the polyestercarbonate polymer of Formula (X) shows a decrease of molecular weight of less than 5%.

The chain transfer catalyst is generally used in the mixture in the amount of from about 300 ppm to about 400 ppm. At levels greater than about 400 ppm, a significant increase in the melt volume rate is seen, which means both poor flow properties (i.e. poor processability) and low molecular weights, which results in poor mechanical and thermal properties. At levels below about 300 ppm, an increase in haze and a decrease in light transmission occurs. An exemplary chain transfer catalyst is tetrabutylphosphonium hydroxide (TBPH).

The polyestercarbonate copolymers of the present disclosure unexpectedly have a desirable combination of high scratch resistance, weatherability, transparency, and/or flow properties. In particular, it was expected that a blend of polymers having similar overall monomer content would have properties similar to a copolymer of the same overall content.

However, the properties of the polyestercarbonate copolymers of the present disclosure cannot be achieved by a blend of polymers.

The polyestercarbonate copolymers of the present disclosure may have a scratch resistance of 15 micrometers or less, when measured using the Erichson Scratch Test with a 6 newton (N) load; a haze level below 5, as measured by ASTM D1003; a light transmittance greater than 75%, as measured by ASTM D1003; a melt volume rate of 25 cc/10 minutes or less, according to ASTM D1238; a total color shift dE* of 12 or less after 500 hours exposure, according to ASTM D2244; a weight average molecular weight of 20,000 or greater; a gloss of 40 or higher when measured according to ASTM D523 after 1000 hours weathering according to SAE J1885; and/or a gloss of 90 or higher when measured according to ASTM D523 after 1000 hours weathering according to SAE J1960; In various embodiments, the polyestercarbonate copolymer meets two or more of these requirements, including as many as six of these requirements.

In some embodiments, the polyestercarbonate copolymer has a scratch resistance of 15 micrometers or less; a haze level below 5; and a percent transmittance higher than 75.

In other embodiments, the polyestercarbonate copolymer has a scratch resistance of 15 micrometers or less; and a melt volume rate of 25 cc/10 minutes or less.

In other embodiments, the polyestercarbonate copolymer has a scratch resistance of 15 micrometers or less; a gloss of 40 or higher when measured according to ASTM D523 after 1000 hours weathering according to SAE J1885; and a gloss of 90 or higher when measured according to ASTM D523 after 1000 hours weathering according to SAE J1960.

In other embodiments, the polyestercarbonate copolymer has a scratch resistance of 15 micrometers or less; a melt volume rate of 25 cc/10 minutes or less; a gloss of 40 or higher when measured according to ASTM D523 after 1000 hours weathering according to SAE J1885; and a gloss of 90 or higher when measured according to ASTM D523 after 1000 hours weathering according to SAE J1960.

In still other embodiments, the polyestercarbonate copolymer has a scratch resistance of 15 micrometers or less; a melt volume rate of 25 cc/10 minutes or less; a haze level below 5; a percent transmittance higher than 75; a gloss of 40 or higher when measured according to ASTM D523 after 1000 hours weathering according to SAE J1885; and a gloss of 90 or higher when measured according to ASTM D523 after 1000 hours weathering according to SAE J1960.

The color shift and gloss tests provide a measure of the polyestercarbonate copolymer's weatherability. For example, ASTM D2244 measures the change in color of indoor plastic materials. SAE J1885 simulates the weathering of automotive interior trim. SAE J1960 simulates the weathering of automotive exterior materials. ASTM D523 is the protocol used to measure gloss. These tests can help determine the suitability of the polyestercarbonate copolymer for these and other applications.

The polyestercarbonate copolymer may further include other additives which can be incorporated with polymeric compositions, with the proviso that the additives are selected so as not to adversely affect the desired properties of the polyestercarbonate copolymer. Mixtures of additives may be used. Such additives may be mixed at a suitable time during the mixing of the components. Examples of such additives include fillers, antioxidants, heat stabilizers, light stabilizers, plasticizers, lubricants, antistatic agents, flame retardants, impact modifiers, and anti-drip agents.

The polyestercarbonate copolymers of the present disclosure are suitable for use in molding articles. The shaped articles can be compression molded, injection molded, blow molded, injection-blow-molded, or extruded. The article can be a solid sheet, an extruded multi-wall sheet, a cast film, or an extruded film. The article can also be a multi-layered article where the outer layer is made from the polyestercarbonate copolymer. Such multi-layered articles include a co-extruded solid sheet, a co-extruded multi-wall sheet, a co-extruded film, or a film cast onto a separately molded part. Alternatively, the multi-layered article may be made by molding a different resin onto a film made from the polyestercarbonate copolymer. Examples of such applications include TV and notebook bezels. Multi-layer articles may be used in mobile phones and other consumer electronic products.

The following examples are provided to illustrate the compositions and methods of the present disclosure. The examples are merely illustrative and are not intended to limit devices made in accordance with the disclosure to the materials, conditions, or process parameters set forth therein.

EXAMPLES

The compositions of the Examples were prepared by compounding on a Werner and Pfleider 25 mm intermeshing twin screw extruder at 300 rpm with barrel temperatures 40-200-250-285-300-300-300-300° C. The plaques used for this study were molded on an Engel 75T molding apparatus having 4 temperature zones set at 280-290-300-295° C. (mold temperature 90° C.).

The Examples discussed herein used the following ingredients in their compositions:

| Ingredient | Description | Supplier |
| --- | --- | --- |
| DMBPC-1 | a copolymer containing 50 mole % DMBPC and 50 mole % BPA | SABIC Innovative Plastics |
| DMBPC-2 | a homopolymer of DMBPC | SABIC Innovative Plastics |
| ITR-1 | a copolymer containing 85 mole % ITR units and 15 mole % BPA | SABIC Innovative Plastics |
| ITR-2 | a copolymer containing 25 mole % DMBPC and 75 mole % ITR units | SABIC Innovative Plastics |
| TBPH | tetrabutylphosphonium hydroxide | |
| TP-1 | a terpolymer containing 54 mole % DMBPC, 22 mole % ITR units, and 24 mole % BPA | SABIC Innovative Plastics |
| TP-2 | a terpolymer containing 34 mole % DMBPC, 17 mole % ITR units, and 49 mole % BPA | SABIC Innovative Plastics |
| PC-1 | a bisphenol-A homopolycarbonate having a weight average molecular weight of 30,000 versus polycarbonate standards and a polydispersity of 2.1 to 2.3. | SABIC Innovative Plastics |

Mechanical properties were measured according to the following ASTM standards:

| | Standards | Testing Conditions | Specimen Type |
| --- | --- | --- | --- |
| Melt Volume Rate | ASTM D1238 | 300° C., 1.2 Kg | |
| Haze | ASTM D1003 | 23° C. | 3.2 mm thickness |
| Transmission | ASTM D1003 | 23° C. | 3.2 mm thickness |
| Scratch Testing | Erichson Scratch Test | load = 6 N | |
| Color Shift | ASTM D2244 | | |

Melt Volume Rate was measured by ASTM D1238. A charge of material was placed in a vertical cylinder with a small die of 2 mm at the bottom and heated at the specified temperature. A specified load was then placed on the molten material and material extruded through the die was collected. The amount of material extruded after a given time was then normalized to cc/10 min.

Haze and transmission were measured according to ASTM D1003. A specimen of a specified thickness was placed in the path of a narrow beam of light so that some of the light passes through the specimen and some of the light continues unimpeded. Both parts of the beam pass into a sphere equipped with a photo detector. The haze and transmission can then be calculated based on the strength of the light beam and the amount of light deviating from the original beam.

Scratch resistance was evaluated according to the Erichson Scratch Test, which is similar to the standard surface hardness scratch test method described in ISO 1518:2001. A stylus pin is held at a 90 degree angle to the test surface and under a constant load of 6 Newtons downward force, then dragged over the surface of a series of test articles. The depth (in micrometers) of the resulting scratches produced on the surface is measured with a profilometer.

The determination of the mole % for DMBPC, ITR, and BPA was done via NMR.

A high performance liquid chromatography (HPLC) method was used to determine the blend/copolymer composition distribution. The method is based on interactions of the copolymer with the polar groups of a silica column. By application of a gradient around the critical point for polycarbonate, the polycarbonate-column interactions are suppressed and polymer retention is governed by the remaining interactions of the polyester blocks with the column. The applied gradient ran from dichloromethane:ether (99.5:0.5) to dichloromethane:ether (85:15) on a silica packed column, e.g. Inertsil 5Si 150×4.6 mm. Typical settings for this analysis were: flow 1.2 ml/min.; injection volume 5 µl; the sample in 10 mg/ml in dichloromethane; and detection through UV absorption at 250 nm.

Example 1

A series of tests was performed to show that the HPLC method was capable of distinguishing between a polymer blend and a copolymer.

Figure 1:
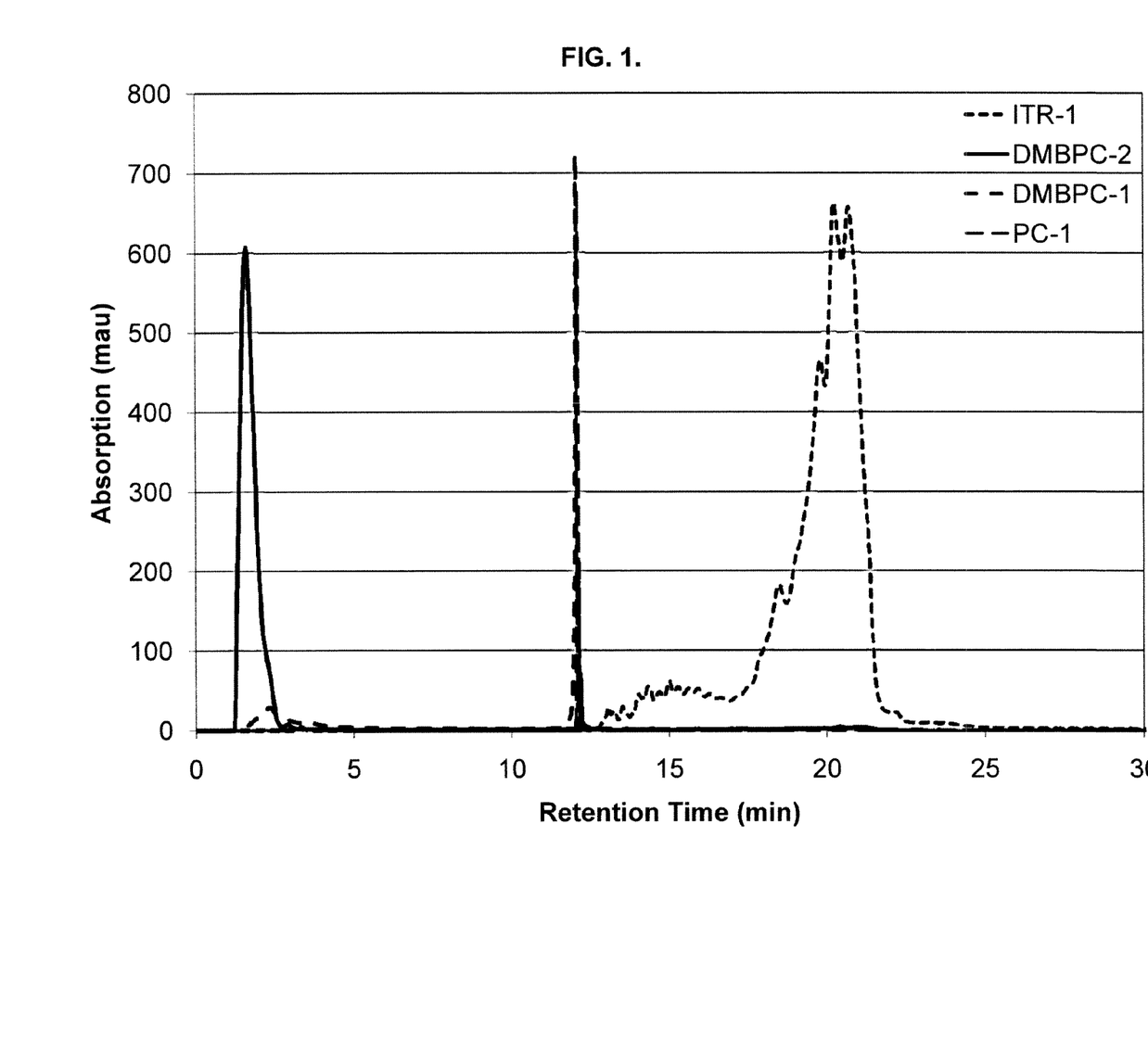
FIG. 1 is an overlay of 4 reference HPLC chromatograms of homopolymers and copolymers used in making blends.

First, reference samples containing DMBPC-1, DMBPC-2, PC-1, and ITR-1 were run through HPLC. The chromatograms are shown in FIG. 1. The reference samples eluted in order of polarity with DMBPC-2 eluting at 1-3 minutes; DMBPC-1 eluting between 2-13 minutes; PC-1 eluting at 12-13 minutes; and ITR-1 eluting from 14-24 minutes. This occurred because DMBPC-1 has an intermediate polarity relative to DMBPC-2 and PC-1. Both DMBPC-1 and PC-1 peaked at the same time; however, DMBPC-1 had a peak value of ~720 while PC-1 had a peak value of ~680.

Figure 2:
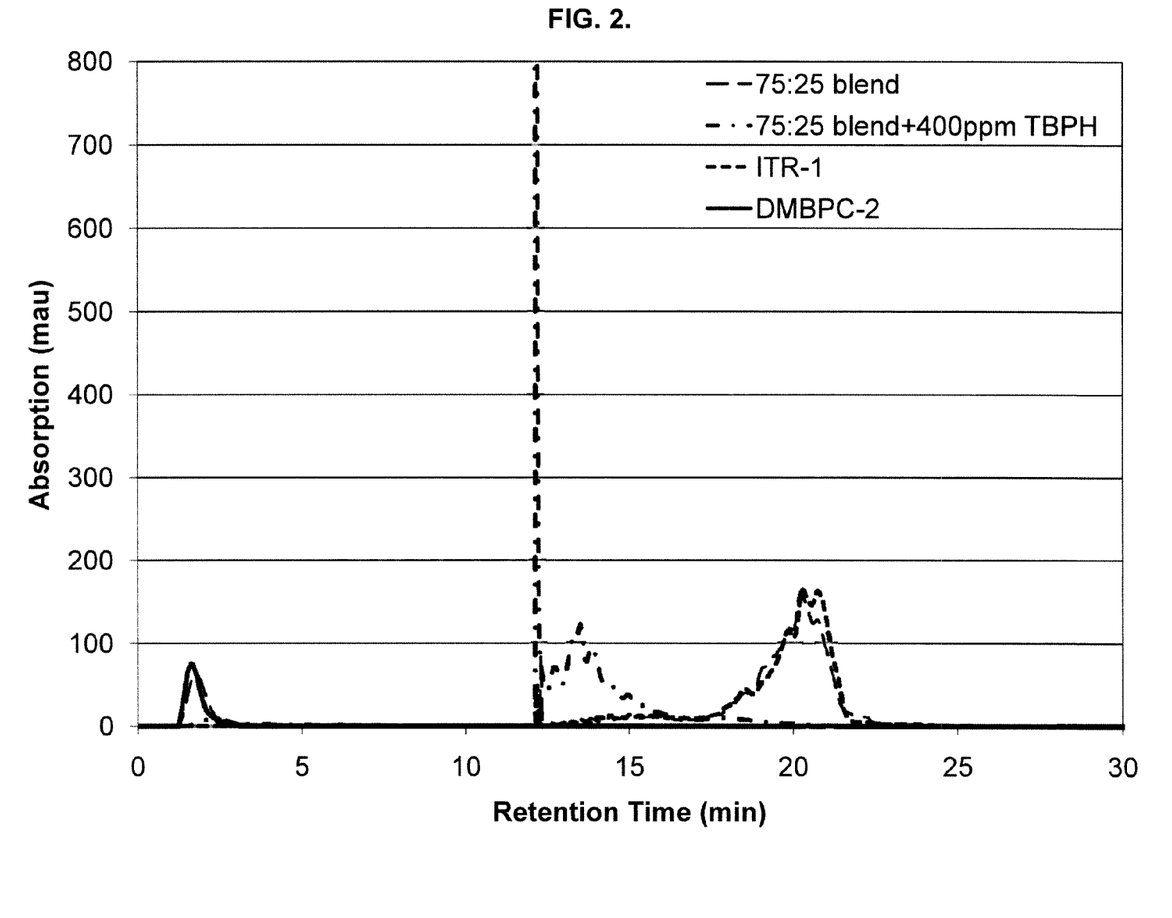
FIG. 2 is an HPLC chromatogram showing the difference in elution behavior between blends and copolymers.

Next, two different samples were run through HPLC. The first sample was a 75:25 blend by weight of DMBPC-2 and ITR-1 without chain transfer catalyst. The second sample was a 75:25 blend of DMBPC-2 and ITR-1 with 400 ppm TBPH, which resulted in a copolymer. The chromatograms are shown in FIG. 2. For reference, the individual chromatograms for DMBPC-2 and ITR-1 are also shown. Both the DMBPC-2 and 75:25 blend had a peak around 2-3 minutes, while the 75:25 blend with 400 ppm TBPH did not. Only the 75:25 blend with 400 ppm TBPH had a peak value around 12-13 minutes, and that value was very large (~1700). Both the 75:25 blend and ITR-1 had a peak around 20 minutes.

A blend of two materials will yield a chromatogram which is the weighted sum of the chromatograms of the individual blend components, whereas a copolymer will give a chromatogram in which the retention time for the peak is an intermediate of the retention time of the homopolymer chromatograms for the monomers that the copolymer is made of.

FIG. 2 showed that for the first sample, the 75:25 blend of DMBPC-2 and ITR-1 without chain transfer catalyst, both of the original polymers were found in the blend since the chromatogram for the blend contained the same peaks as the individual chromatograms for DMBPC-2 and ITR-1. For the second sample, containing chain transfer catalyst, the chromatogram changed significantly. The areas of the peaks for the second sample were 86-92% below the peaks for DMBPC-2 and ITR-1 individually. This indicated that most of the original DMBPC-2 and ITR-1 polymers had reacted to form a copolymer of intermediate polarity (elution time 12-17 min.).

Example 2

A polyestercarbonate copolymer containing about 54 mole % DMBPC units, about 22 mole % ITR units, and about 24 mole % BPA units was prepared.

A reactor was equipped with an overhead condenser, an agitator and a circulation pump. A formulation mixture of methylene chloride (15 L), resorcinol (1465 grams dissolved in 1275 mL water), triethylamine (70 grams) and sodium gluconate (5 grams) was added to the reactor. A 50/50 mixture of molten terephthaloyl chloride and isophthaloyl chloride (2000 grams) was then added to the reactor at a rate of 267 grams/minute. The reaction pH was maintained by the addition of 50% aqueous NaOH at an approximate rate of 190 grams/minute in order to maintain a target pH of 4. The reaction mixture was then allowed to stir for 10 minutes while the pH was gradually increased to 8 by the addition of 50% aqueous NaOH. A sample of the oligomer reaction product was analyzed by GPC and found to have an Mw of 8414 and Mn of 3698 (vs polycarbonate standards).

A mixture of bisphenol-A (245 grams), DMBPC (6755 grams), p-cumylphenol (420 grams), water (22 L), and methylene chloride (75 L) was prepared and then combined in the reactor with the oligomer product. Phosgene gas (5950 grams) was added to the reactor at a rate of 176 grams/minute. The reaction pH was maintained at a target of 8.5 by the addition of 50% aqueous NaOH. Upon completion of the phosgene addition, the reaction mixture was allowed to stir for 10 minutes while the pH was gradually increased to 9 by the addition of 50% aqueous NaOH. A sample of the polymerization reaction product was analyzed by GPC and found to have a Mw of 23357 and an Mn of 9099.

The reactor was purged with nitrogen for 5 minutes, then the contents were discharged to a feed tank. The mixture was fed to a train of liquid-liquid centrifuges where the brine phase was separated from the polymer solution in methylene chloride, triethylamine was removed by washing the polymer solution with 1% aqueous HCl, and residual ions were removed by washing with water. The purified polymer solution was transferred to a feed pot. The resin was isolated by contacting the polymer solution with steam through a precipitation jet to flash off the methylene chloride leaving a white wet cake. Water was removed from the resin by placing it in a cone shaped dryer and passing heated nitrogen through the powder for four hours. The resin powder yield was 10.7 kg. The resin powder was analyzed and found to have a Mw of 23156 (vs polycarbonate standard) and a percent ester content of 21.2.

Example 3

Five comparative compositions CE1-CE5 and five test compositions E1-E5 were prepared by weathering them according to SAE J1885. They were then tested for scratch resistance according to the Erichson scratch test, haze and light transmittance according to ASTM D1003, and color shift according to ASTM D2244. All of the comparative compositions were blends, whereas all of the test compositions were terpolymers. The results are shown in Table 1.

TABLE 1

| Description | CE1 | CE2 | CE3 | CE4 | CE5 | E1 | E2 | E3 | E4 | E5 |
|---|---|---|---|---|---|---|---|---|---|---|
| DMBPC-1 (phr) | 100 | | | | | | | | | |
| DMBPC-2 (phr) | | | 95 | 90 | 75 | 95 | 90 | 75 | | |
| ITR-1 (phr) | | 100 | 5 | 10 | 25 | 5 | 10 | 25 | | |
| TBPH (phr) | | | | | | 0.4 | 0.4 | 0.4 | | |
| TP-1 (phr) | | | | | | | | | 100 | |
| TP-2 (phr) | | | | | | | | | | 100 |
| mol % DMBPC | 50 | — | 88.6 | 83.6 | 70.3 | 89.3 | 84.1 | 68.4 | 54 | 34 |
| mol % ITR | — | 85 | 6.5 | 11 | 22.8 | 5.8 | 10.4 | 24.4 | 22 | 17 |
| mol % BPA | 50 | 15 | 4.9 | 5.4 | 6.9 | 5 | 5.5 | 7.2 | 24 | 49 |
| MVR (g/10 min) | 12.5 | 11 | 16.5 | 16.4 | 16 | 38.8 | 37.8 | 34.7 | 14.6 | 20.5 |
| Scratch depth (μm) | 12 | 14.6 | 8.7 | 8.9 | 9.6 | 8.7 | 9 | 9.6 | 11.4 | 14 |
| Initial Haze (%) | 0.9 | 0.7 | 75.3 | 99.4 | 104 | 0.4 | 0.4 | 0.4 | 2.7 | 3.4 |
| Initial LT (%) | 91.2 | 89.0 | 54.8 | 43.4 | 30.9 | 89.5 | 89.5 | 89.4 | 75.4 | 81.9 |
| Color Shift (dE) | | | | | | | | | | |
| 0 hrs | 0.0 | 0.0 | — | — | — | 0.0 | 0.0 | 0.0 | 0.0 | 0.0 |
| 150 hrs | 8.4 | 2.3 | — | — | — | 9.7 | 7.0 | 5.1 | 2.5 | 2.4 |
| 250 hrs | 10.1 | 2.8 | — | — | — | 11.4 | 8.3 | 5.5 | 2.6 | 3.6 |
| 500 hrs | 12.4 | 3.6 | — | — | — | 11.4 | 8.1 | 6.4 | 2.9 | 4.0 |

Interestingly, the addition of a chain transfer catalyst to what would otherwise have been a blend resulted in a copolymer instead (see E1, E2, E3). However, a significant increase in the melt volume rate also occurred (compare CE3-CE5 with E1-E3). These high melt volume rates were directly related to the low molecular weights of E1-E3. Low molecular weights are generally not desired. The copolymers of E1-E5 also had better haze and light transmittance values than the blends CE3-CE5, i.e. they were transparent. The copolymers E4 and E5, formed by interfacial polymerization, had weight average molecular weights higher than 20,000, which was not achieved with E1-E3.

Figure 3:
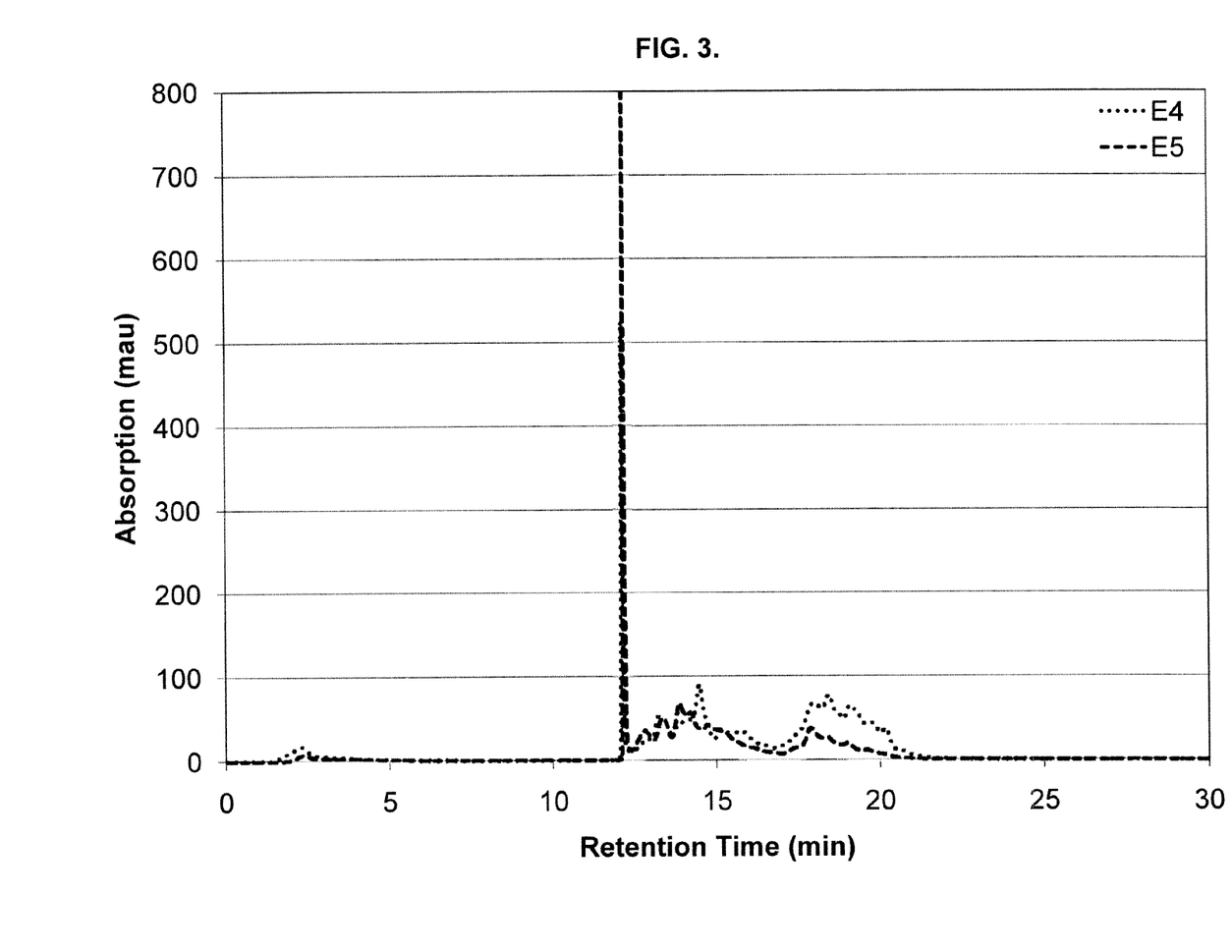
FIG. 3 is an HPLC chromatogram of two copolymers of the present disclosure made by reactively extruding two polymers together with a chain transfer catalyst.

Examples E4 and E5 were run through the HPLC. The chromatogram is shown in FIG. 3. The peak for E4 and E5 is at the same location as the peak in FIG. 2, indicating that E4 and E5 are copolymers rather than a blend. However, their peak values do differ; E4 had a peak value of ~520 while E5 had a peak value of ~900. There were also some small signals in between those of the 75:25 blend with 400 ppm TBPH and ITR-1 in FIG. 2, indicating that there is somewhat more variation in the composition between molecules than for the 75:25 blend with 400 ppm TBPH.

Example 4

The compositions of Example 3 were again made, but with a dye included. Thus, the compositions were again denoted as CE1-CE5 and E1-E5. Another copolymer was made as well and is labeled as E6. The results are shown in Table 2.

TABLE 2

| Description | CE1 | CE2 | CE3 | CE4 | CE5 | E1 | E2 | E3 | E4 | E5 | E6 |
|---|---|---|---|---|---|---|---|---|---|---|---|
| DMBPC-1 (phr) | 100 | | | | | | | | | | |
| DMBPC-2 (phr) | | | 95 | 90 | 75 | 95 | 90 | 75 | | | |
| ITR-1 (phr) | | 100 | 5 | 10 | 25 | 5 | 10 | 25 | | | |
| ITR-2 (phr) | | | | | | | | | | | 100 |
| TBPH (phr) | | | | | | 0.4 | 0.4 | 0.4 | | | |
| TP-1 (phr) | | | | | | | | | 100 | | |
| TP-2 (phr) | | | | | | | | | | 100 | |
| Green dye (phr) | 0.13 | 0.13 | 0.13 | 0.13 | 0.13 | 0.13 | 0.13 | 0.13 | 0.13 | 0.13 | 0.13 |
| Red dye (phr) | 0.13 | 0.13 | 0.13 | 0.13 | 0.13 | 0.13 | 0.13 | 0.13 | 0.13 | 0.13 | 0.13 |
| mol % DMBPC | 50 | 0 | 88.6 | 83.6 | 70.3 | 89.3 | 84.1 | 68.4 | 54 | 34 | 25 |
| mol % ITR | 0 | 85 | 6.5 | 11 | 22.8 | 5.8 | 10.4 | 24.4 | 22 | 17 | 75 |
| mol % BPA | 50 | 15 | 4.9 | 5.4 | 6.9 | 5 | 5.5 | 7.2 | 24 | 49 | 0 |
| MVR (g/10 min) | 17 | 10.3 | 16.5 | 16.4 | 16 | 38.8 | 37.8 | 34.7 | 14.6 | 20.4 | 16 |
| Scratch depth (μm) | 12 | 14.6 | 8.7 | 8.9 | 9.6 | 8.7 | 9 | 9.6 | 11.4 | 14 | 12.5 |
| Gloss initial | 100 | 106.7 | 101 | 101.8 | 103.7 | 102.9 | 100.9 | 103.6 | 103.3 | 99.9 | 105.3 |
| 150 hrs | 104 | 107.8 | 79.2 | 84 | 95 | 75.8 | 84.2 | 85.4 | 91 | 103.3 | 105.1 |
| 250 hrs | 66.3 | 105.4 | 53.2 | 56.1 | 66.2 | 54.2 | 57.7 | 68 | 76.3 | 83.2 | 94.7 |
| 500 hrs | 40.5 | 100.4 | 38.8 | 47.5 | 54.3 | 41.4 | 48.2 | 54.5 | 62.3 | 66.9 | 84.4 |
| 750 hrs | 32.4 | 92.3 | 25.9 | 45.1 | 39.2 | 45.1 | 36.8 | 52.1 | 55.2 | 52.6 | 75.2 |
| 1000 hrs | 15.9 | 81.2 | 23.2 | 27.2 | 34.2 | 41.5 | 33.8 | 40.9 | 43.1 | 49.8 | 63.9 |

As seen here, the blends CE3-CE5 had poor gloss results compared to the copolymers E1-E5. The copolymers had a combination of good scratch resistance and good gloss results. E6 had similar scratch resistance to CE1, but much better gloss results.

Example 5

The compositions of Example 4 were prepared and tested for scratch resistance and gloss according to SAE J1960 (exterior weathering protocol). The compositions were again denoted as CE1-CE5 and E1-E6. The results are shown in Table 3.

TABLE 3

| Description | CE1 | CE2 | CE3 | CE4 | CE5 | E1 | E2 | E3 | E4 | E5 | E6 |
|---|---|---|---|---|---|---|---|---|---|---|---|
| DMBPC-1 (phr) | 100 | | | | | | | | | | |
| DMBPC-2 (phr) | | | 95 | 90 | 75 | 95 | 90 | 75 | | | |
| ITR-1 (phr) | | 100 | 5 | 10 | 25 | 5 | 10 | 25 | | | |
| ITR-2 (phr) | | | | | | | | | | | 100 |
| TBPH (phr) | | | | | | 0.4 | 0.4 | 0.4 | | | |
| TP-1 (phr) | | | | | | | | | 100 | | |
| TP-2 (phr) | | | | | | | | | | 100 | |
| Green dye (phr) | 0.13 | 0.13 | 0.13 | 0.13 | 0.13 | 0.13 | 0.13 | 0.13 | 0.13 | 0.13 | 0.13 |
| Red dye (phr) | 0.13 | 0.13 | 0.13 | 0.13 | 0.13 | 0.13 | 0.13 | 0.13 | 0.13 | 0.13 | 0.13 |
| mol % DMBPC | 50 | 0 | 88.6 | 83.6 | 70.3 | 89.3 | 84.1 | 68.4 | 54 | 34 | 25 |
| mol % ITR | 0 | 85 | 6.5 | 11 | 22.8 | 5.8 | 10.4 | 24.4 | 22 | 17 | 75 |
| mol % BPA | 50 | 15 | 4.9 | 5.4 | 6.9 | 5 | 5.5 | 7.2 | 24 | 49 | 0 |
| MVR (g/10 min) | 17 | 10.3 | 16.5 | 16.4 | 16 | 38.8 | 37.8 | 34.7 | 14.6 | 20.4 | 16 |
| Scratch depth (μm) | 12 | 14.6 | 8.7 | 8.9 | 9.6 | 8.7 | 9 | 9.6 | 11.4 | 14 | 12.5 |
| Gloss initial | 100 | 106.7 | 101 | 101.8 | 103.7 | 102.9 | 100.9 | 103.6 | 103.3 | 99.9 | 105.3 |
| 500 hrs | 96.5 | 108 | 63 | 64.6 | 81 | 101.6 | 102.3 | 102.6 | 100.1 | 93.5 | 106.2 |
| 1000 hrs | 89.6 | 109.6 | 46 | 42 | 60.1 | 98.1 | 98.6 | 93.2 | 94.8 | 92.5 | 106.7 |
| 1500 hrs | 91.4 | 111.9 | 25.1 | 16.4 | 44.9 | 101.9 | 97.3 | 94.1 | 99.6 | 93.6 | 107.5 |

TABLE 3-continued

| Description | CE1 | CE2 | CE3 | CE4 | CE5 | E1 | E2 | E3 | E4 | E5 | E6 |
|---|---|---|---|---|---|---|---|---|---|---|---|
| 2000 hrs | 78.7 | 101.3 | 15.6 | 14.3 | 29.9 | 92.3 | 78.6 | 72.8 | 83 | 86.7 | 99.6 |
| 2500 hrs | 79.4 | 104 | 14.1 | 13 | 19 | 88.5 | 67 | 65 | 82.5 | 91.2 | 109.8 |
| 3000 hrs | 75.4 | 103.4 | 12.9 | 9.2 | 14.4 | 80.2 | 55.8 | 55.8 | 84.8 | 89 | 106.9 |
| 3500 hrs | 73.4 | 103.8 | 11.1 | 6.6 | 7.2 | 75.4 | 50.8 | 52.1 | 85.4 | 90.8 | 106 |
| 4000 hrs | 69.6 | 104.6 | 8.3 | 4.7 | 6.5 | 69.2 | 45.3 | 47 | 77.1 | 92 | 104.8 |
| 4500 hrs | 70.7 | 107.9 | 7.2 | 3.9 | 5.1 | 68.1 | 42.9 | 40.7 | 74.4 | 91.5 | 103.6 |

Again, the blends CE3-CE5 had poor weathering resistance compared to copolymers E1-E5, as seen in the low gloss results. E6 had similar scratch resistance to CE1, but much better gloss results. CE1 and CE2 were expected to have good scratch resistance and weathering properties, and E4 and E5 performed similarly to them, indicating that these polyestercarbonate copolymers also had good scratch resistance and weathering properties.

Example 6

Various polyestercarbonate copolymers were made by blending two polymers together with a chain transfer catalyst, TBPH. The amount of chain transfer catalyst was varied, and the haze, light transmittance, and weight average molecular weight were measured. The results are seen in FIG. 4 and FIG. 5.

Figure 4:
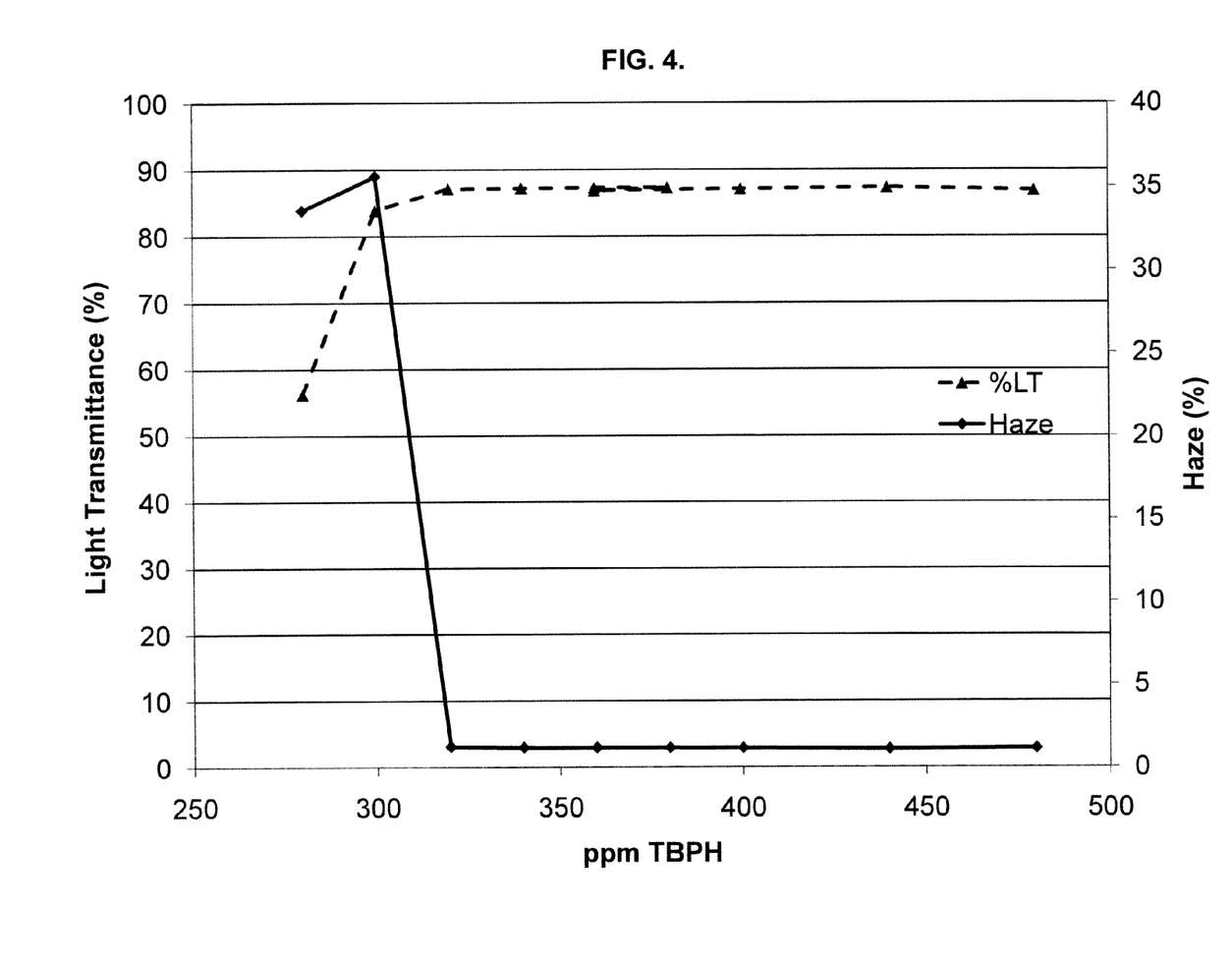
FIG. 4 is a graph showing the effect of the concentration of chain transfer catalyst on haze and light transmittance.
Figure 5:
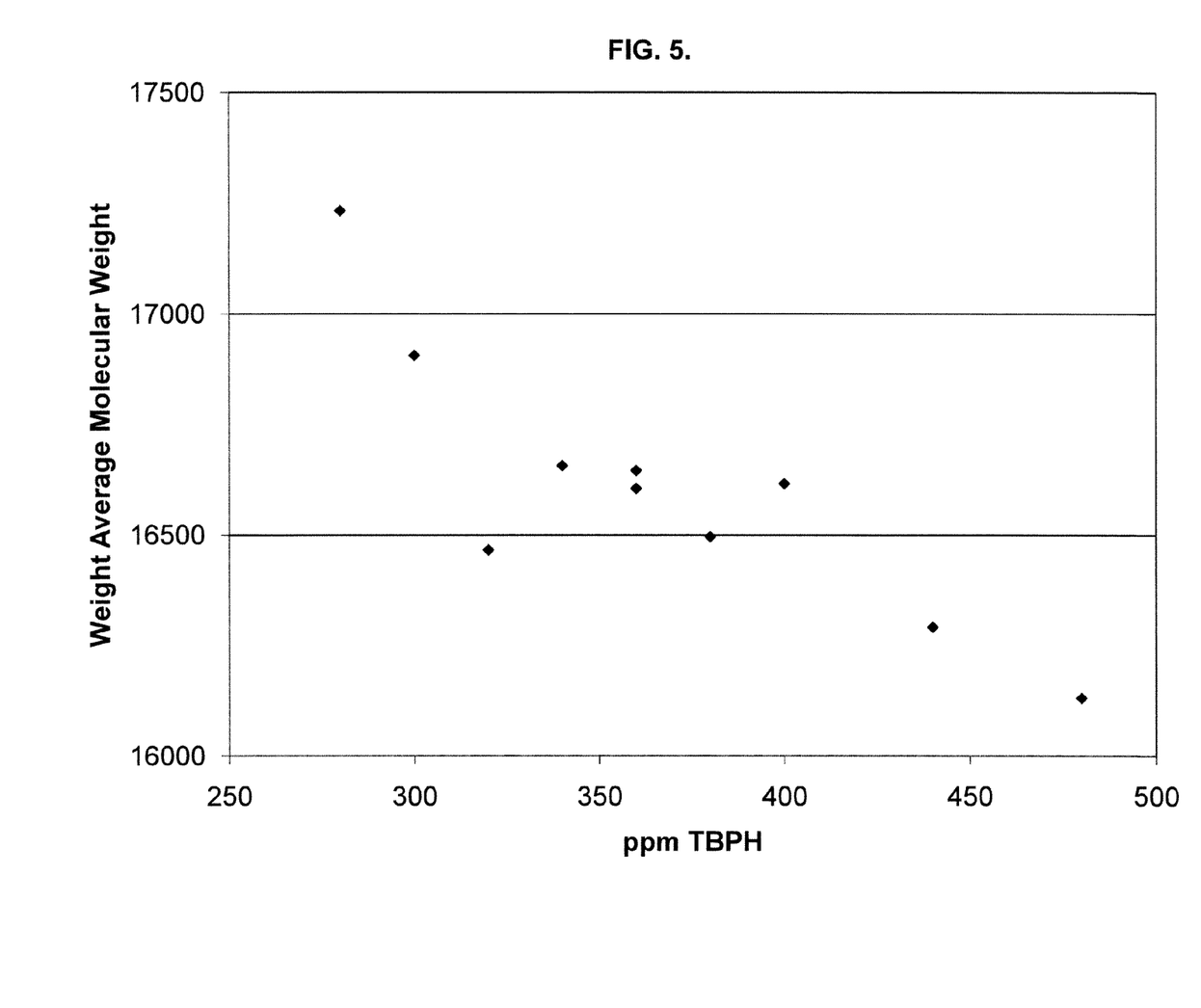
FIG. 5 is a graph showing the effect of the concentration of chain transfer catalyst on molecular weight.

As seen in FIG. 4, if a concentration of TBPH lower than 300 ppm was used, the polyestercarbonate copolymer became extremely hazy and had reduced light transmittance. As seen in FIG. 5, the molecular weight decreased as the concentration of TBPH increased.

The polyestercarbonate copolymers of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. An article formed from a polyestercarbonate terpolymer, the terpolymer comprising:

from about 30 to about 90 mole percent of a DMBPC unit of Formula (III):

Formula (III)

from about 5 to about 50 mole percent of an ITR ester unit of Formula (V):

Formula (V)

wherein h corresponds to the molar percentage of the isophthalate, j corresponds to the molar percentage of the resorcinolate, and k corresponds to the molar percentage of the terephthalate; h, j, and k add up to 100 mole percent of the ester unit; each $R^c$ is independently selected from $C_{1-12}$ alkyl and halogen; and r is an integer from zero to 3;

from about 5 to about 25 mole percent of a bisphenol A unit of Formula (VII):

Formula (VII)

wherein the polyestercarbonate terpolymer has a scratch resistance of 15 micrometers or less, when measured using the Erichson Scratch Test with a 6N load; and a haze level below 5 and a light transmittance greater than 75%, as measured by ASTM D1003;

wherein the terpolymer is formed by mixing the DMPBC unit, the ITR ester unit, the bisphenol-A unit, and a chain transfer catalyst to form a mixture, wherein the chain transfer catalyst is present in the mixture in the amount of from 300 ppm to 400 ppm, and reacting the mixture to form the terpolymer.

2. The article of claim 1, wherein the polyestercarbonate terpolymer has a total color shift dE* of 12 or less after 500 hours exposure, according to ASTM D2244.

3. The article of claim 1, wherein the polyestercarbonate terpolymer has a gloss of 40 or higher when measured according to ASTM D523 after 1000 hours weathering according to SAE J1885.

4. The article of claim 1, wherein the polyestercarbonate terpolymer has a gloss of 90 or higher when measured according to ASTM D523 after 1000 hours weathering according to SAE J1960.

5. The article of claim 1, wherein the polyestercarbonate terpolymer has a melt volume rate of 25 cc/10 minutes or less, according to ASTM D1238.

6. A method of preparing a polyestercarbonate terpolymer, comprising:

providing a polycarbonate polymer of Formula (IX) and a polyestercarbonate polymer of Formula (X):

Formula (IX)

wherein each $R^a$ and $R^b$ is independently halogen or hydrocarbon; p and q are independently integers from 1 to 4; A is selected from $C_1$-$C_{12}$ alkyl, $C_6$-$C_{20}$ aromatic, and $C_6$-$C_{20}$ cycloaliphatic; and w is the degree of polymerization;

Formula (X)

wherein $R^1$, $R^2$, and T are independently divalent organic radicals; m is the molar percentage of carbonate units; and n is the molar percentage of ester units;

mixing the polycarbonate polymer, the polyestercarbonate polymer, and a chain transfer catalyst to form a mixture, wherein the chain transfer catalyst is present in the mixture in the amount of from 300 ppm to 400 ppm; and reacting the mixture to form the polyestercarbonate terpolymer;

wherein the polyestercarbonate terpolymer has a scratch resistance of 15 micrometers or less, when measured using the Erichson Scratch Test with a 6N load; and a haze level below 5 and a light transmittance greater than 75%, as measured by ASTM D1003.

* * * * *